(12) United States Patent
Chen

(10) Patent No.: US 8,142,326 B2
(45) Date of Patent: Mar. 27, 2012

(54) MULTI-GEAR MECHANISM FOR POWER TOOLS

(75) Inventor: Ting-Kuang Chen, Keelung (TW)

(73) Assignee: Power Network Industry Co., Ltd., Ping-Jen (TW)

( * ) Notice: Subject to any disclaimer, the term of this patent is extended or adjusted under 35 U.S.C. 154(b) by 443 days.

(21) Appl. No.: 12/546,983

(22) Filed: Aug. 25, 2009

(65) Prior Publication Data

US 2011/0053728 A1 Mar. 3, 2011

(51) Int. Cl.
*F16H 3/44* (2006.01)
*B25D 16/00* (2006.01)

(52) U.S. Cl. ............ 475/299; 475/286; 173/216
(58) Field of Classification Search ............ 475/286, 475/290, 298, 299, 317, 323; 173/47, 216, 173/217

See application file for complete search history.

(56) References Cited

U.S. PATENT DOCUMENTS

| 4,493,223 A * | 1/1985 | Kishi et al. ............ 74/371 |
| 6,431,289 B1 * | 8/2002 | Potter et al. ............ 173/47 |
| 2008/0173459 A1 * | 7/2008 | Kuroyanagi et al. ...... 173/216 |
| 2009/0071673 A1 * | 3/2009 | Zhong et al. ............ 173/216 |

* cited by examiner

*Primary Examiner* — Roger Pang
(74) *Attorney, Agent, or Firm* — Rabin & Berdo, P.C.

(57) ABSTRACT

A multi-gear mechanism includes first and second gear sets, an output set, multiple first planet gears pivotably connected between the first and second gear sets, a first gear ring having internal teeth and external teeth, multiple second planet gears cooperated with the internal teeth of the first gear ring, a second gear ring having internal teeth and side teeth, an operation gear ring and a motor gear. The motor gear extends through two central holes of the first and second gear sets, and the first and second planet gears are engaged with the motor gear. The operation gear ring is connected with the second gear ring which drives the operation gear ring to move axially. The motor gear drives the output set at low speed, constant speed or high speed when the operation gear ring and the second gear ring are operated to engage with different gears.

2 Claims, 6 Drawing Sheets

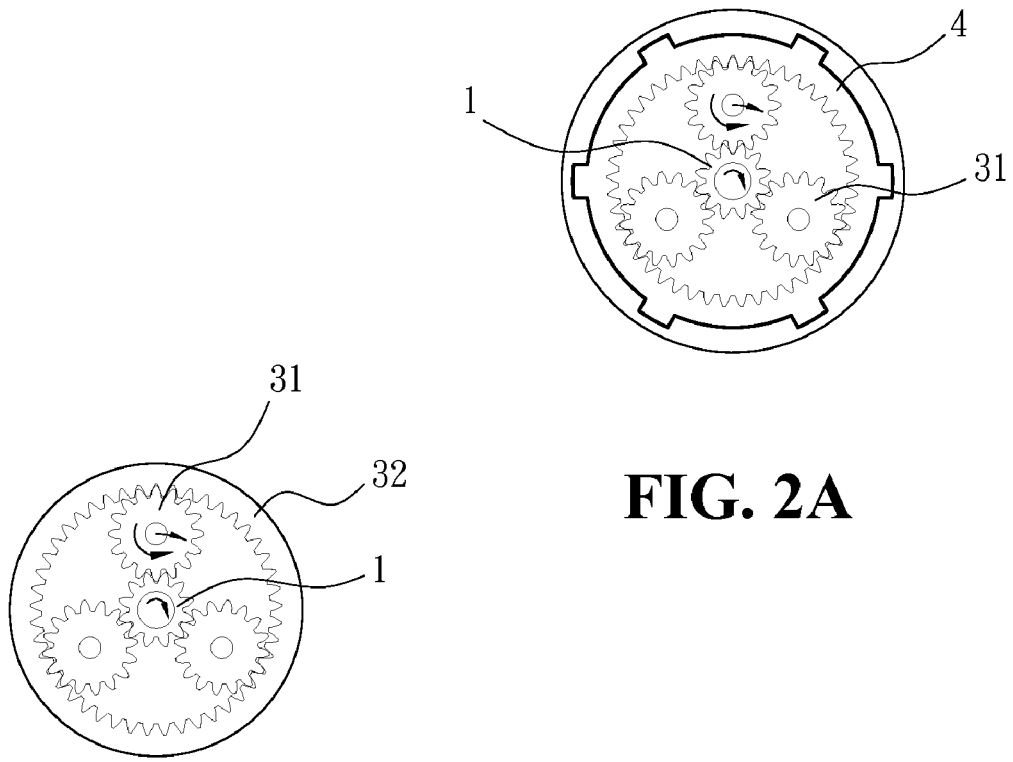
FIG. 2A
FIG. 2B
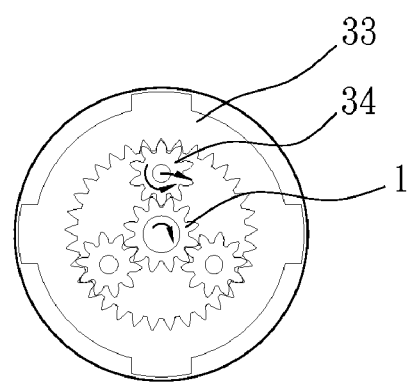
FIG. 2C

MULTI-GEAR MECHANISM FOR POWER TOOLS

BACKGROUND OF THE INVENTION

1. Field of the Invention

The present invention relates generally to a multi-gear mechanism for power tools, and in particular to a mechanism for adjusting speed of the power tools.

2. The Prior Arts

Conventional power tools use a gear set to adjust the speed of the motor in the power tool so as to obtain desired speed on the output shaft. The conventional mechanism for adjustment of the speed of the output shaft generally provides three modes which are low speed, constant speed and high speed. However, the conventional mechanism involves a complicated structure and high manufacturing cost.

SUMMARY OF THE INVENTION

A primary objective of the present invention is to provide a multi-gear mechanism for power tools in which the mechanism includes less complicated structure and can be made at low cost.

The mechanism includes a lever which extends out from a case of a power tool and users can shift the lever axially to control the mechanism for obtaining the desired output speed.

According to the present invention, a multi-gear mechanism for power tools comprises first and second gear sets, an output set, multiple first planet gears pivotably connected between the first and second gear sets, a first gear ring having internal teeth and external teeth, multiple second planet gears pivotably connected to the output set and engaged with the internal teeth of the first gear ring, a second gear ring having internal teeth and side teeth, an operation gear ring and a motor gear. The motor gear extends through two respective central holes of the first and second gear sets, and the first and second planet gears are engaged with the motor gear. The operation gear ring is connected to the second gear ring which drives the operation gear ring to move axially. When the operation gear ring is engaged with the first gear set, and the internal teeth and the side teeth of the second gear ring are respectively engaged with the first planet gears and the external teeth of the first gear ring, the motor gear drives the output set at low speed. When the operation gear ring and the internal teeth of the second gear ring are both engaged with the first planet gears, and the side teeth of the second gear ring are engaged with external teeth of the first gear ring, the motor gear drives the output set at constant speed. When the operation gear ring and the internal teeth of the second gear ring are respectively engaged with the first planet gears and the second gear set, and the side teeth of the second gear ring are engaged with the external teeth of the first gear ring, the motor gear drives the output set at high speed.

The multi-gear mechanism of the present invention is less complicated when compared with the conventional mechanism and can be manufactured at low cost so that the multi-gear mechanism of the present invention is more competitive in the market.

BRIEF DESCRIPTION OF THE DRAWINGS

The present invention will be apparent to those skilled in the art by reading the following detailed description of a preferred embodiment thereof, with reference to the attached drawings, in which:

FIG. 2A is a sectional view taken along line 2A-2A in FIG. 2;

FIG. 2B is a sectional view taken along line 2B-2B in FIG. 2;

FIG. 2C is a sectional view taken along line 2C-2C in FIG. 2;

DETAILED DESCRIPTION OF THE PREFERRED EMBODIMENT

Figure 1:
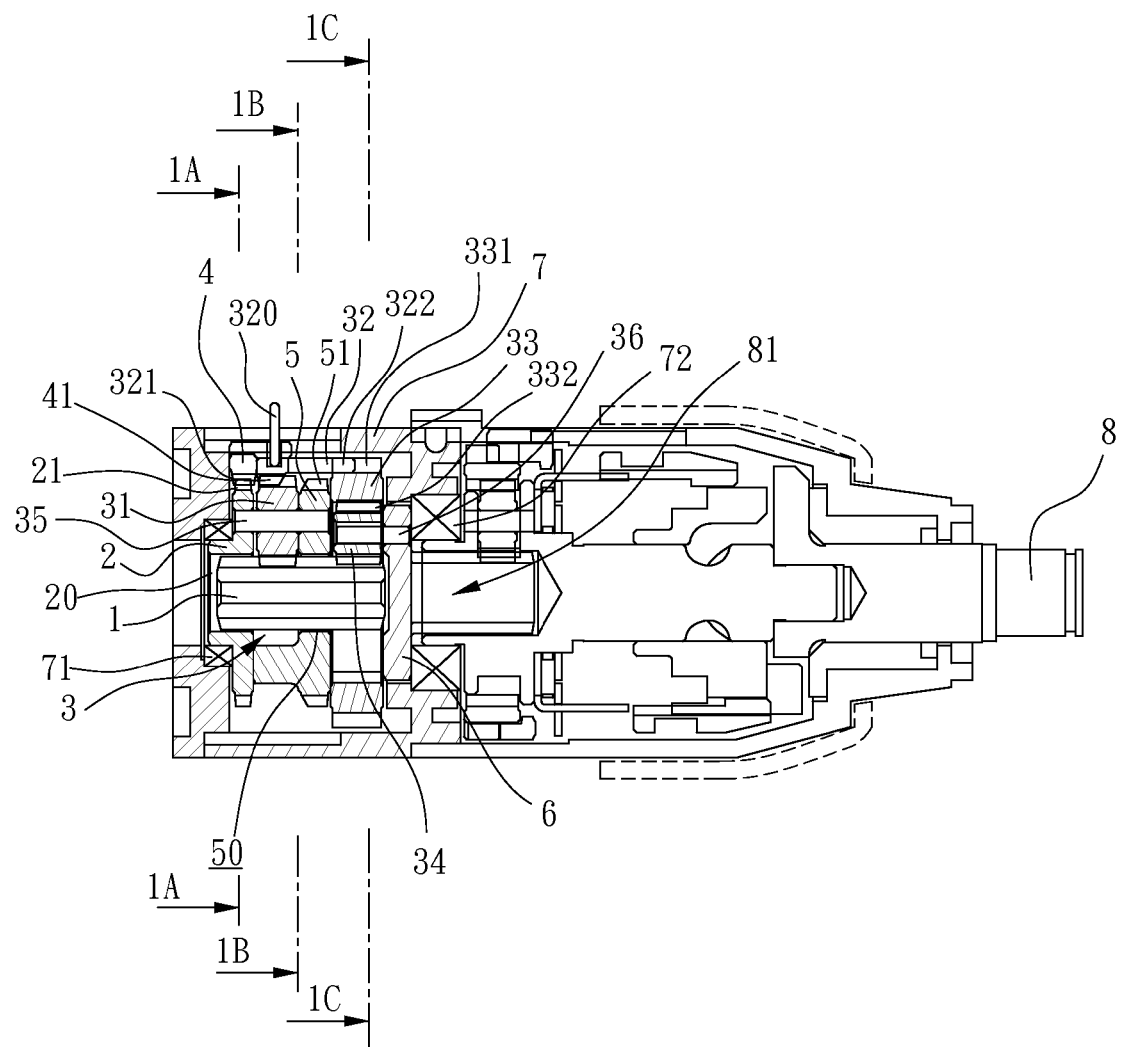
FIG. 1 shows a multi-gear mechanism in accordance with the present invention, in which an output shaft is operated at low speed.
Figure 1A:
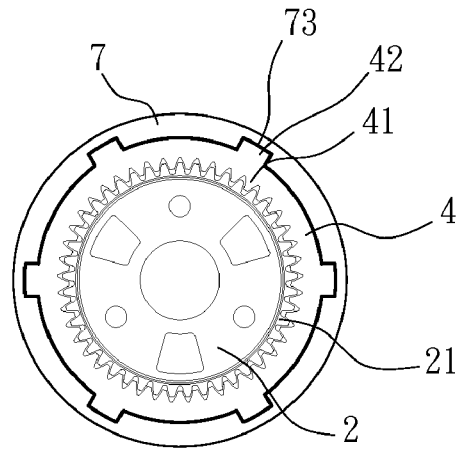
FIG. 1A is a sectional view taken along line 1A-1A in FIG. 1.
Figure 1B:
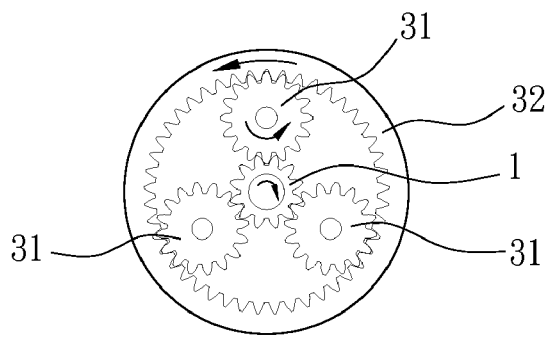
FIG. 1B is a sectional view taken along line 1B-1B in FIG. 1.
Figure 1C:
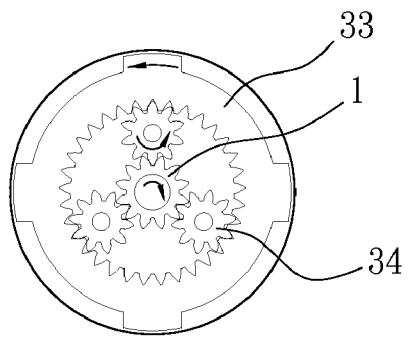
FIG. 1C is a sectional view taken along line 1C-1C in FIG. 1.

With reference to the drawings and in particular to FIGS. 1, 1A, 1B and 1C, a multi-gear mechanism for power tools of the present invention comprises a motor gear 1, a first gear set 2 having a first central hole 20 and teeth 21 defined on an outside thereof, an operation gear ring 4, a second gear set 5 having a second central hole 50 and teeth 51 defined on an outside thereof, multiple first planet gears 31 pivotably connected between the first and second gear sets 2, 5 by first pins 35, an output set 6, multiple second planet gears 34 pivotably connected to the output set 6 by second pins 36, a first gear ring 33 including external teeth 331 defined on an outer periphery thereof and internal teeth 332 defined on an inner periphery thereof. The power tool includes an output shaft 8 which can be operated at low speed, constant speed and high speed. The first gear set 2 is cooperated with a first bearing 71 and located within a case 7 of the power tool. The operation gear ring 4 includes multiple ribs 42 on the outer periphery thereof and the ribs 42 are engaged with keyways 73 defined in the inner periphery of the case 7. By this arrangement, the operation gear ring 4 can be moved axially relative to the case 7 and cannot rotate relative to the case 7. The second planet gears 34 are located within the inner periphery of the first gear ring 33 and engaged with the internal teeth 332 of the first gear ring 33.

The motor gear 1 is connected to a motor (not shown) and extends through the first and second central holes 20, 50 of the first and second gear sets 2, 5, and the first planet gears 31 and the second planet gears 34 are engaged with the motor gear 1. The output set 6 is connected with a connection mechanism 81 which is connected with the output shaft 8.

A second gear ring 32 has side teeth 322 on a side thereof and internal teeth 321 are defined on an inner periphery of the second gear ring 32. The first planet gears 31 and the second gear set 5 are located within the inner periphery of the second gear ring 32. The internal teeth 321 are engaged with the first planet gears 31 and the teeth 51 of the second gear set 5, and the side teeth 322 are engaged with the external teeth 331 of the first gear ring 33. The second gear ring 32 is connected with a lever 320 on an outside thereof and the lever extends through the case 7 so that the user can operate the lever 320 in axial direction along the central shaft of the motor gear 1 to control the internal teeth 321 of the second gear ring 32 to be engage or disengage with the first planet gears 31 and the teeth 51 of the second gear set 5. The side teeth 322 of the second gear ring 32 are moved along axial direction of the second gear ring 32 and engaged with the external teeth 331 of the first gear ring 33 permanently.

The operation gear ring 4 includes internal teeth 41 defined in an inner periphery thereof, the first gear set 2 is located within the inner periphery of the operation gear ring 4 and the internal teeth 41 of the operation gear ring 4 are engaged with the teeth 21 of the first gear set 2. The operation gear ring 4 is connected to the second gear ring 32 so that the operation gear ring 4 can be moved axially with the second gear ring 32 so as to control the engagement between the internal teeth 41 and the teeth 21 of the first gear set 2.

FIGS. 1, 1A to 1C show the output shaft 8 of the multi-gear mechanism of the present invention is operated at low speed, in which when the user pulls the lever 320 toward left as in FIG. 1, the internal teeth 41 of the operation gear ring 4 are engaged with the first gear set 2, and the internal teeth 321 and the side teeth 322 of the second gear ring 32 are engaged with the first planet gears 31 and the first gear ring 33 respectively. The operation gear ring 4 is secured with the case 7 and the first gear set 2 are engaged with the internal teeth 41 of the operation gear ring 4, so that the first gear set 2 remains stationary. At this time, the motor gear 1 rotates clockwise drives the first planet gears 31 counter clockwise, and the first planet gears 31 drives the second gear ring 32 counter clockwise. The second gear ring 32 drives the first gear ring 33 counter clockwise, and the first and second gear sets 2, 5 are stationary. When the second gear set 5 is stationary, the first and second planet gears 31, 34 are functioned as idle gears and rotate counter clockwise slowly so that the output shaft 8 rotates at low speed.

Figure 2:
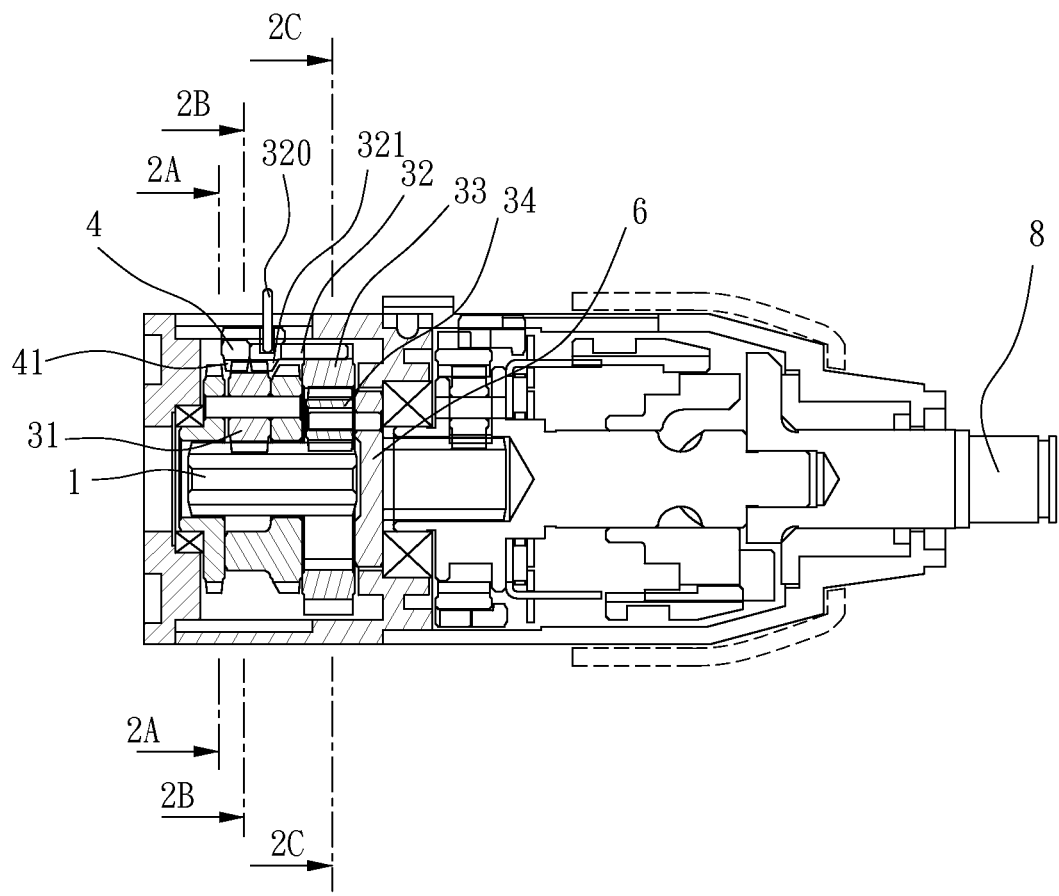
FIG. 2 shows the multi-gear mechanism in accordance with the present invention, in which the output shaft is operated at constant speed.

FIGS. 2, 2A to 2C show the output shaft 8 of the multi-gear mechanism of the present invention is operated at constant speed, in which when the user pulls the lever 320 toward right as in FIG. 2, the internal teeth 41 of the operation gear ring 4 and the internal teeth 321 of the second gear ring 32 are both engaged with the first planet gears 32. The motor gear 1 rotates clockwise drives the first and second planet gears 31, 34 counter clockwise to balance the transmission force. Because the first planet gears 31 is pivotably connected between the first and second gear sets 2, 5 by the first pins 35 and the first and second gear sets 2, 5 are not secured, the first planet gear 31 can rotate about the motor gear 1 within the second gear ring 32 and the operation gear ring 4, when the motor gear 1 drives the first planet gears 31 counter clockwise. At this time, the operation gear ring 4 and the second gear ring 32 are fixed so that when the motor gear 1 rotates clockwise, the output set 6 rotates clockwise and drives the output shaft 8 to rotate at constant speed.

Figure 3:
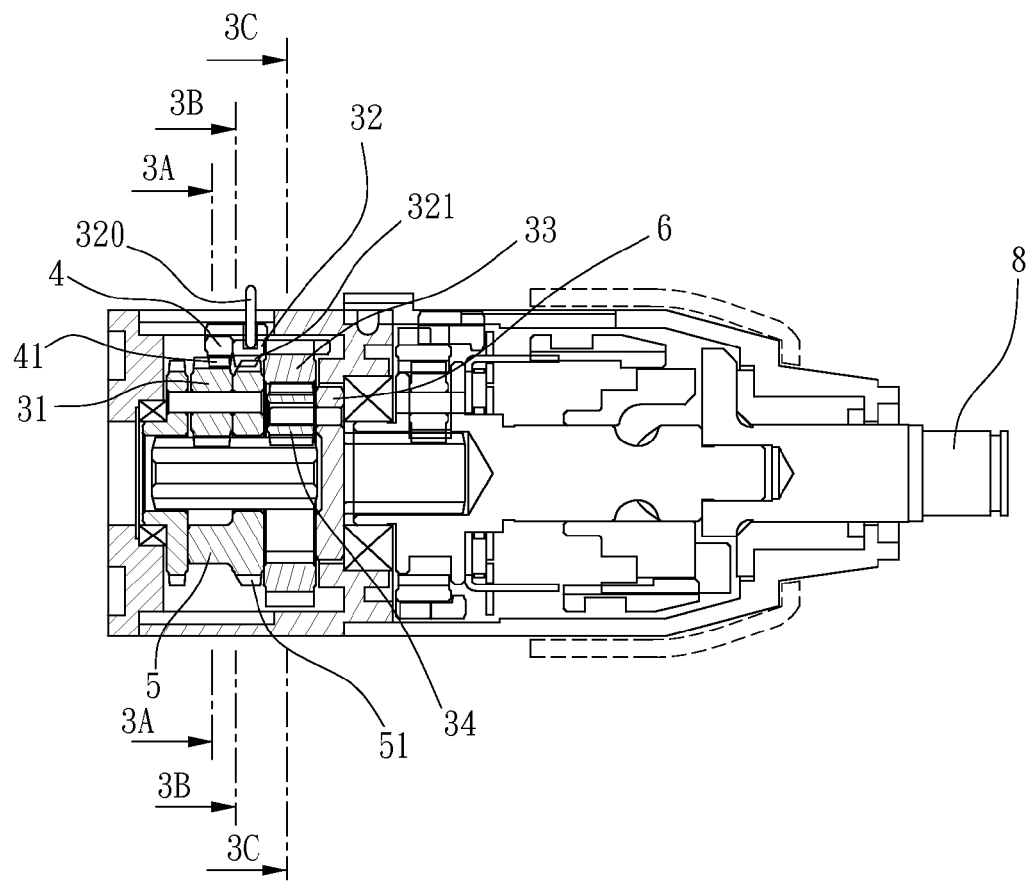
FIG. 3 shows the multi-gear mechanism in accordance with the present invention, in which the output shaft is operated at high speed.
Figure 3A:
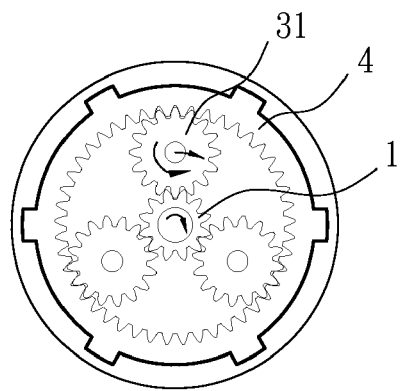
FIG. 3A is a sectional view taken along line 3A-3A in FIG. 3.
Figure 3B:
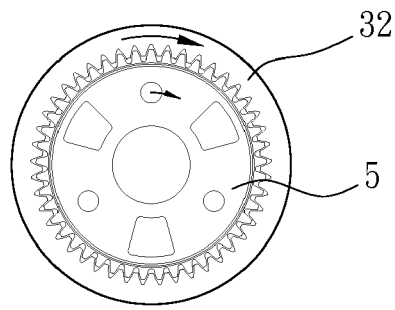
FIG. 3B is a sectional view taken along line 3B-3B in FIG. 3.
Figure 3C:
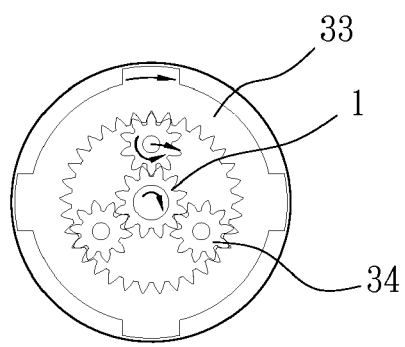
FIG. 3C is a sectional view taken along line 3C-3C in FIG. 3.

FIGS. 3, 3A to 3C show the output shaft 8 of the multi-gear mechanism of the present invention is operated at high speed, in which when the user pulls the lever 320 toward right as in FIG. 3, the internal teeth 41 of the operation gear ring 4 are engaged with the first planet gears 31 and the internal teeth 321 of the second gear ring 32 are engaged with the teeth 51 of the second gear set 5. The motor gear 1 rotates clockwise drives the first planet gears 31 and the second gear set 5 counter clockwise. The second gear ring 32 is driven by the second gear set 5 and the second gear ring 32 drives the first gear ring 33 clockwise. The second planet gears 34 accelerate the output set 6 so that the output shaft 8 rotates at high speed.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A multi-gear mechanism for power tools, comprising:
a first gear set having a first central hole and teeth defined on an outside thereof;
a second gear set having a second central hole and teeth defined on an outside thereof;
multiple first planet gears pivotably connected between the first and second gear sets by first pins;
an output set;
multiple second planet gears pivotably connected to the output set by second pins;
a first gear ring including external teeth defined on an outer periphery thereof and internal teeth defined on an inner periphery thereof, the second planet gears located within the inner periphery of the first gear ring and engaged with the internal teeth;
a motor gear extending through the first and second central holes of the first and second gear sets, the first planet gears and the second planet gears engaged with the motor gear;
a second gear ring having side teeth on a side thereof and internal teeth defined on an inner periphery of the second gear ring, the first planet gears and the second gear set located within the inner periphery of the second gear ring, the internal teeth engaged with the first planet gears and the teeth of the second gear set, the side teeth engaged with the outside teeth of the first gear ring, and
an operation gear ring including internal teeth defined on an inner periphery thereof, the first gear set located within the inner periphery of the operation gear ring and the internal teeth of the operation gear ring engaged with the teeth of the first gear set, the operation gear ring being connected with the second gear ring.

2. The mechanism as claimed in claim 1, wherein the second inner gear ring includes a lever.

* * * * *